United States Patent
McGhee, III

(10) Patent No.: US 10,314,395 B2
(45) Date of Patent: Jun. 11, 2019

(54) PALLET SPACER SYSTEM AND METHOD OF USE

(71) Applicant: James E. McGhee, III, Garden Grove, CA (US)

(72) Inventor: James E. McGhee, III, Garden Grove, CA (US)

( * ) Notice: Subject to any disclaimer, the term of this patent is extended or adjusted under 35 U.S.C. 154(b) by 0 days.

(21) Appl. No.: 15/437,798

(22) Filed: Feb. 21, 2017

(65) Prior Publication Data

US 2018/0235364 A1   Aug. 23, 2018

(51) Int. Cl.
| | |
|---|---|
| A47B 87/00 | (2006.01) |
| A47B 47/02 | (2006.01) |
| F16M 13/02 | (2006.01) |
| B65D 19/40 | (2006.01) |
| B65G 1/02 | (2006.01) |

(52) U.S. Cl.
CPC .......... *A47B 87/001* (2013.01); *A47B 47/028* (2013.01); *A47B 87/008* (2013.01); *B65D 19/40* (2013.01); *B65G 1/02* (2013.01); *F16M 13/02* (2013.01)

(58) Field of Classification Search
CPC ... A47B 87/007; A47B 96/1441; A47B 96/14; A47B 47/028; A47B 87/008; A47B 87/001; B65D 19/40; B65G 1/02; F16M 13/02
USPC ....... 211/183, 191, 192, 189, 180, 193, 182; 248/200.1, 201, 235, 239, 241, 243, 247, 248/248; 403/167, 168
See application file for complete search history.

(56) References Cited

U.S. PATENT DOCUMENTS

| | | | | |
|---|---|---|---|---|
| 645,257 | A * | 3/1900 | Greener | A47B 47/027 211/182 |
| 774,379 | A * | 11/1904 | Cavanaugh | A43D 117/00 211/182 |
| 1,356,749 | A * | 10/1920 | Sorg | E06C 1/18 182/180.1 |
| 1,359,987 | A * | 11/1920 | Hamilton | A47F 7/175 211/182 |
| 1,563,057 | A * | 11/1925 | Williams | B62B 3/006 211/134 |
| 1,569,358 | A * | 1/1926 | Cross | A47B 61/00 211/182 |
| 1,569,366 | A * | 1/1926 | Goldberg | A47F 7/175 211/182 |
| 1,969,656 | A * | 8/1934 | Marlowe | E04G 1/34 108/91 |

(Continued)

OTHER PUBLICATIONS

Rack Safety Products, "Pallet Rack Flue Protection", downloaded Feb. 17, 2017, www.racksafetyproducts.com/, Temecula, California.

*Primary Examiner* — Jonathan Liu
*Assistant Examiner* — Devin K Barnett

(57) ABSTRACT

An elongated integral stop rail device extending the length of a row of pallet racks and carried from the racks by hangers which space the rail device at a desired distance from the lateral extent of the racks. The method involves a determination of the length of the row of racks, assembling a stop rail device to extend that length, and mounting the stop rail device from the respective racks the desired distance lateral of the racks. A pair of integral stop rail devices may be spaced laterally apart to block encroachment of pallets supported on adjacent rows of pallets into a flue space defined between the pair.

2 Claims, 8 Drawing Sheets

(56) References Cited

U.S. PATENT DOCUMENTS

| | | | | |
|---|---|---|---|---|
| 2,043,036 A * | 6/1936 | Duncan | A47B 61/003 | 211/182 |
| 2,066,478 A * | 1/1937 | Lewin, Jr. | A47F 5/10 | 211/182 |
| 2,117,285 A * | 5/1938 | Bitzer | A22C 15/002 | 211/123 |
| 2,327,587 A * | 8/1943 | Attwood | B65G 1/02 | 211/182 |
| 2,440,513 A * | 4/1948 | Garey | A22C 15/007 | 211/118 |
| 2,469,151 A * | 5/1949 | Bremer | B25H 1/00 | 211/182 |
| 2,894,641 A * | 7/1959 | Edwards, Jr. | A47B 47/022 | 211/134 |
| 2,933,195 A * | 4/1960 | Radek | A47B 57/58 | 211/153 |
| 2,937,767 A * | 5/1960 | Butler | A47B 47/021 | 211/187 |
| 3,017,037 A * | 1/1962 | McDonnell | B65G 17/20 | 211/113 |
| 3,095,975 A * | 7/1963 | Cassel | A47B 57/402 | 211/192 |
| 3,106,297 A * | 10/1963 | Schroeder | A47B 57/40 | 211/187 |
| 3,127,995 A * | 4/1964 | Mosinski | A47B 57/402 | 211/182 |
| 3,144,944 A * | 8/1964 | McConnell | A47B 57/487 | 211/192 |
| 3,171,541 A * | 3/1965 | Weisberger | A47F 5/01 | 211/182 |
| 3,212,648 A * | 10/1965 | Baker, Jr. | A47B 47/022 | 108/108 |
| 3,273,720 A * | 9/1966 | Seiz | A47B 57/402 | 108/107 |
| 3,285,428 A * | 11/1966 | Scheck | A47B 57/06 | 211/182 |
| 3,337,061 A * | 8/1967 | Caudell | B65G 1/02 | 211/134 |
| 3,365,073 A * | 1/1968 | Degener | A47B 57/26 | 211/182 |
| 3,494,478 A * | 2/1970 | Link | A47B 47/027 | 211/182 |
| 3,602,374 A * | 8/1971 | Alabaster | A47B 57/485 | 211/193 |
| 3,612,291 A * | 10/1971 | Skubic | A47B 47/022 | 211/208 |
| 3,626,487 A * | 12/1971 | Seiz | A47B 57/485 | 169/54 |
| 3,727,694 A * | 4/1973 | Dudzik | A62C 35/605 | 169/16 |
| 3,730,108 A * | 5/1973 | Stroh | A47B 45/00 | 108/108 |
| 3,732,930 A * | 5/1973 | D'Anneo | A62C 37/10 | 169/54 |
| 3,770,147 A * | 11/1973 | Kito | B65G 1/02 | 104/123 |
| 3,802,574 A | 4/1974 | Weider | | |
| 3,827,377 A * | 8/1974 | Aughtry, Jr. | A47F 5/103 | 108/108 |
| 3,871,525 A | 3/1975 | Al-Dabbagh et al. | | |
| 3,971,476 A * | 7/1976 | Konstant | A47F 5/10 | 211/134 |
| 4,030,611 A * | 6/1977 | Konstant | A47B 57/485 | 211/182 |
| 4,033,138 A * | 7/1977 | Griswold | E02D 17/08 | 403/167 |
| 4,150,753 A * | 4/1979 | Stahl | A47F 5/13 | 211/105.1 |
| 4,216,729 A * | 8/1980 | Schrader | A47B 96/024 | 108/159 |
| 4,558,789 A * | 12/1985 | Troutner | H02B 5/02 | 211/107 |
| 4,624,342 A * | 11/1986 | Anderson | E04G 1/20 | 182/119 |
| 4,678,091 A * | 7/1987 | Konstant | A47B 57/44 | 211/182 |
| 4,729,484 A * | 3/1988 | McConnell | A47B 57/402 | 211/183 |
| 4,729,485 A * | 3/1988 | Kulbersh | A47F 5/13 | 211/181.1 |
| 4,821,844 A * | 4/1989 | Huffman | E04G 5/06 | 182/130 |
| 4,874,148 A | 10/1989 | Guinter | | |
| 4,979,627 A | 12/1990 | Stolzer | | |
| 4,981,225 A | 1/1991 | Cole | | |
| 5,161,701 A * | 11/1992 | Berny | A47B 47/022 | 108/108 |
| 5,180,068 A * | 1/1993 | Vargo | F16L 312/10 | 211/191 |
| 5,201,429 A * | 4/1993 | Hikosaka | B65G 1/1375 | 211/59.2 |
| 5,257,794 A * | 11/1993 | Nakamura | B62B 3/00 | 211/182 |
| 5,316,157 A * | 5/1994 | Konstant | A47B 53/00 | 211/151 |
| 5,316,253 A * | 5/1994 | Flathau | E04G 5/06 | 248/235 |
| 5,324,957 A * | 6/1994 | Hejazi | G03B 42/045 | 198/807 |
| 5,368,174 A | 11/1994 | Clarlk et al. | | |
| 5,437,380 A * | 8/1995 | Peay | A47F 5/0056 | 108/61 |
| 5,450,840 A * | 9/1995 | Kozdas | F24C 15/36 | 126/211 |
| 5,573,125 A * | 11/1996 | Denny | A47B 96/00 | 160/84.01 |
| 5,583,125 A | 12/1996 | Steinmeyer et al. | | |
| 5,657,887 A * | 8/1997 | Smith | B65D 19/10 | 108/55.1 |
| 5,743,412 A * | 4/1998 | Noble | A47F 1/121 | 211/182 |
| 5,896,820 A * | 4/1999 | Klinkner | A01C 5/068 | 111/191 |
| 5,931,320 A * | 8/1999 | Gajda | A47B 81/00 | 211/1.3 |
| 5,984,121 A | 11/1999 | Cole | | |
| 6,129,224 A * | 10/2000 | Mingers | A47B 57/482 | 211/190 |
| 6,173,846 B1 | 1/2001 | Anderson | | |
| 6,216,893 B1 * | 4/2001 | Lee | B65G 1/02 | 211/182 |
| 6,260,719 B1 * | 7/2001 | Azzopardi | B65G 1/02 | 211/189 |
| 6,354,758 B1 * | 3/2002 | Chaulk | E04G 1/15 | 182/222 |
| 6,450,350 B1 * | 9/2002 | Krummell, Jr. | A47B 47/027 | 211/183 |
| 6,585,122 B2 | 7/2003 | Calleja | | |
| 6,604,640 B1 * | 8/2003 | Jehin | A47B 47/027 | 211/189 |
| D485,414 S * | 1/2004 | Yamamoto | D34/38 | |
| 6,698,604 B2 | 3/2004 | Denny et al. | | |
| 6,722,512 B2 | 4/2004 | Scully | | |
| 6,758,448 B1 | 7/2004 | Williams et al. | | |
| 6,776,298 B2 * | 8/2004 | Courtwright | B65G 1/026 | 211/183 |
| 7,059,573 B2 | 6/2006 | Calleja | | |
| 7,404,533 B1 | 7/2008 | Kologe | | |
| 7,438,268 B2 * | 10/2008 | Kologe | A47F 5/0838 | 248/220.22 |
| 7,458,744 B2 * | 12/2008 | Hall | A47B 57/193 | 211/193 |
| 7,510,152 B2 * | 3/2009 | Melic | E04G 21/3233 | 211/105.6 |
| 7,757,870 B2 * | 7/2010 | Lin | C25D 17/08 | 211/118 |
| 8,235,224 B2 * | 8/2012 | Scholz | A47B 47/027 | 211/23 |

(56) References Cited

U.S. PATENT DOCUMENTS

| | | | | |
|---|---|---|---|---|
| 8,579,127 B2* | 11/2013 | Dyck | | A47B 96/068 |
| | | | | 211/103 |
| 8,875,774 B1* | 11/2014 | Flores | | E04G 21/30 |
| | | | | 160/351 |
| 9,033,361 B2* | 5/2015 | Frankel | | B62B 3/007 |
| | | | | 280/47.34 |
| 9,066,585 B2* | 6/2015 | Kirby | | B65G 1/02 |
| 9,119,471 B2* | 9/2015 | Gonzalez | | A47B 96/1408 |
| 9,289,065 B1* | 3/2016 | Lambertson | | A47B 96/027 |
| 9,402,330 B2* | 7/2016 | Chappell | | H05K 7/183 |
| 9,604,784 B2* | 3/2017 | McAuliffe | | B65G 1/14 |
| 9,661,921 B1* | 5/2017 | Tsai | | A47B 57/50 |
| 2002/0148799 A1* | 10/2002 | Denny | | A47B 47/021 |
| | | | | 211/186 |
| 2003/0178383 A1* | 9/2003 | Craft | | A47B 81/00 |
| | | | | 211/85.7 |
| 2004/0016708 A1* | 1/2004 | Rafferty | | H05K 7/1492 |
| | | | | 211/26 |
| 2005/0103736 A1* | 5/2005 | Calleja | | A47B 47/021 |
| | | | | 211/189 |
| 2005/0224427 A1* | 10/2005 | Hatanaka | | A47B 53/02 |
| | | | | 211/1.51 |
| 2006/0237378 A1* | 10/2006 | Pellegrino | | A47F 5/0018 |
| | | | | 211/29 |
| 2007/0187349 A1 | 8/2007 | Calleja | | |
| 2009/0084746 A1* | 4/2009 | Rioux | | A47B 47/021 |
| | | | | 211/183 |
| 2010/0018802 A1* | 1/2010 | Sani | | E04G 3/30 |
| | | | | 182/142 |
| 2010/0054906 A1* | 3/2010 | Hartman | | B65G 1/02 |
| | | | | 414/807 |
| 2010/0200528 A1* | 8/2010 | Tourdot | | A47B 53/02 |
| | | | | 211/86.01 |
| 2011/0049074 A1* | 3/2011 | Woolard | | B65G 1/02 |
| | | | | 211/191 |
| 2011/0139733 A1* | 6/2011 | Hartman | | B65G 1/02 |
| | | | | 211/13.1 |
| 2012/0145657 A1* | 6/2012 | Krummell | | B65G 1/02 |
| | | | | 211/49.1 |
| 2013/0068705 A1* | 3/2013 | Parker | | A47B 53/00 |
| | | | | 211/13.1 |
| 2013/0098856 A1* | 4/2013 | Troyner | | A47B 57/402 |
| | | | | 211/153 |
| 2013/0105428 A1* | 5/2013 | Yaniak | | A47B 55/00 |
| | | | | 211/168 |
| 2014/0110547 A1 | 4/2014 | Consaul | | |
| 2014/0124468 A1* | 5/2014 | Lundrigan | | A47B 87/0284 |
| | | | | 211/182 |
| 2014/0138503 A1* | 5/2014 | Consaul | | A47B 97/00 |
| | | | | 248/214 |
| 2014/0160713 A1* | 6/2014 | Eguchi | | H05K 7/1488 |
| | | | | 361/807 |
| 2015/0014262 A1 | 1/2015 | McAuliffe | | |
| 2015/0060381 A1 | 3/2015 | Consaul | | |
| 2015/0101998 A1* | 4/2015 | Keck | | B65G 1/02 |
| | | | | 211/49.1 |
| 2015/0158629 A1* | 6/2015 | Harris | | B65D 19/385 |
| | | | | 108/53.3 |
| 2016/0007740 A1* | 1/2016 | Consaul | | B65G 1/02 |
| | | | | 211/187 |
| 2016/0214795 A1* | 7/2016 | Consaul | | B65G 1/02 |
| 2016/0369941 A1* | 12/2016 | Consaul | | F16M 13/02 |
| 2017/0095075 A1* | 4/2017 | Keck | | A47B 47/028 |
| 2017/0252592 A1* | 9/2017 | Pigeon | | A62C 3/002 |
| 2017/0258221 A1* | 9/2017 | Iellimo | | A47B 47/021 |

* cited by examiner

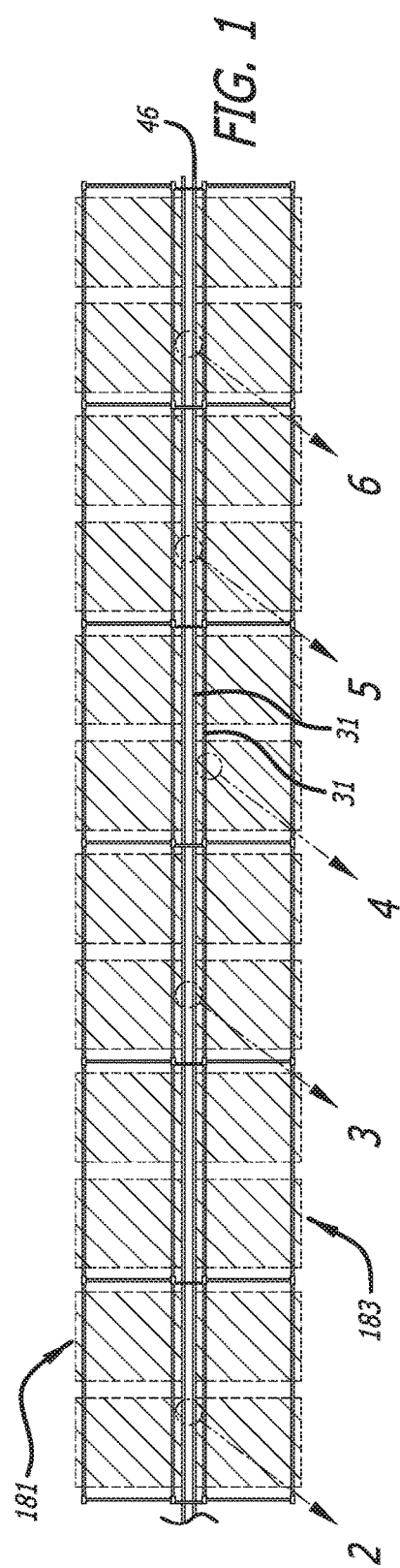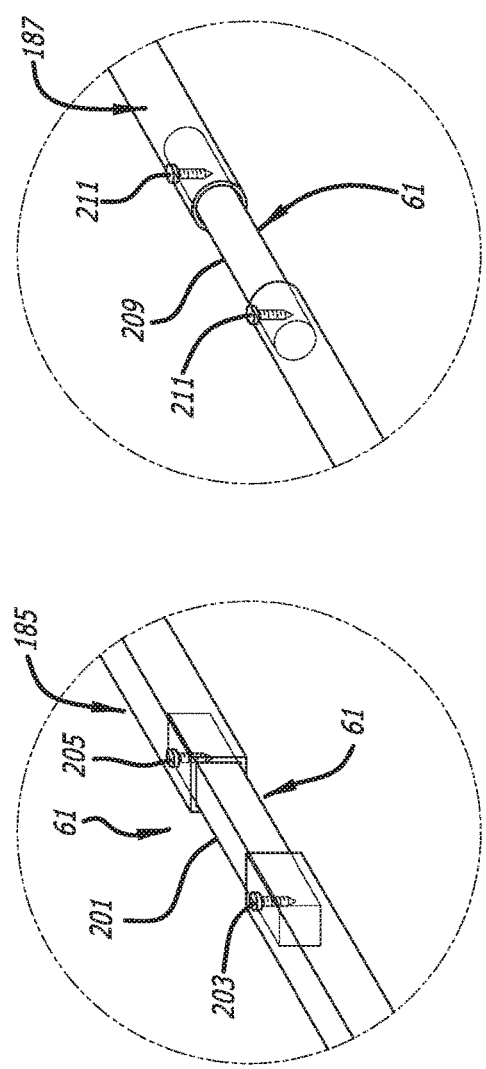

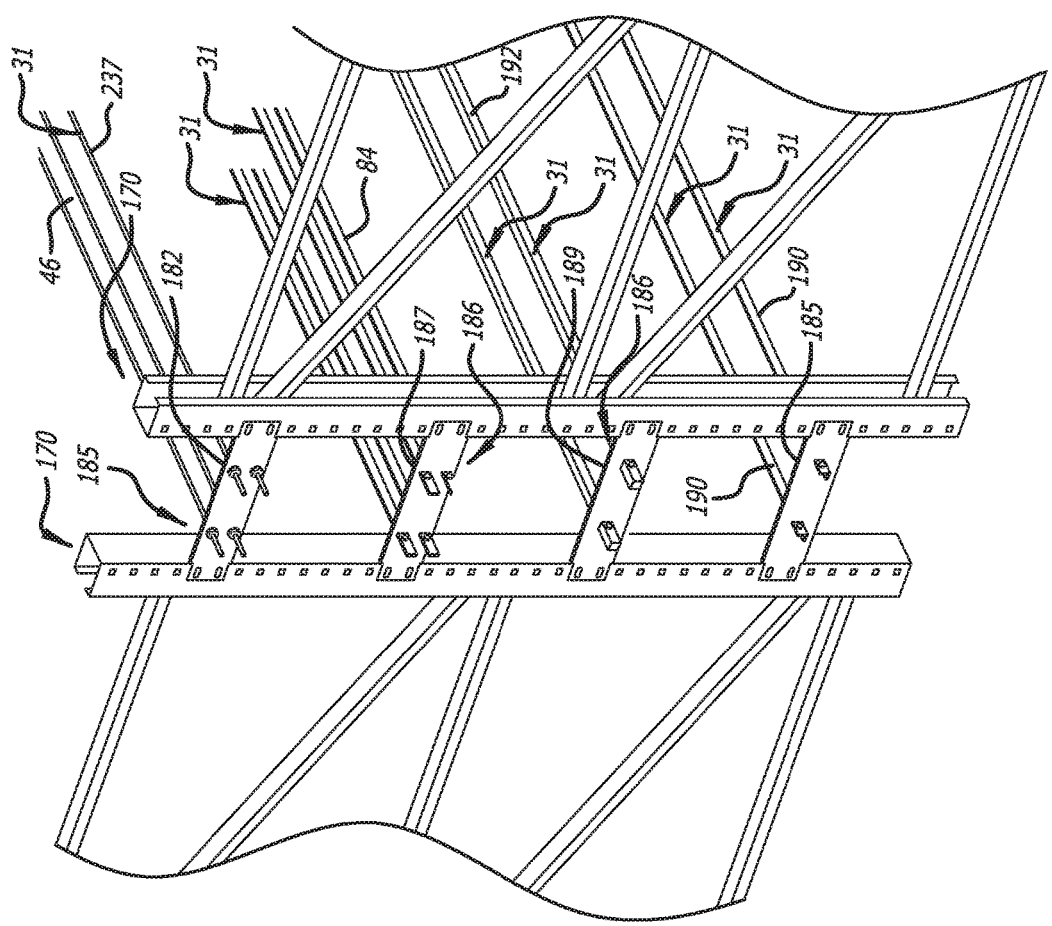

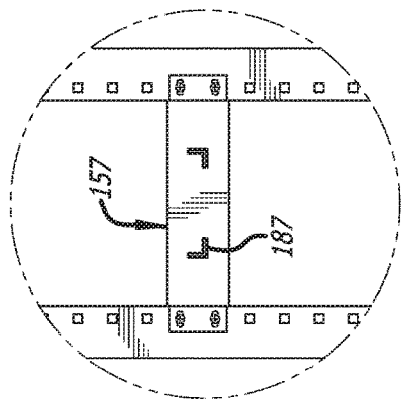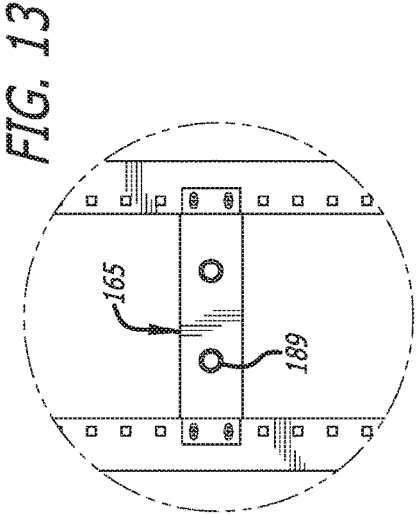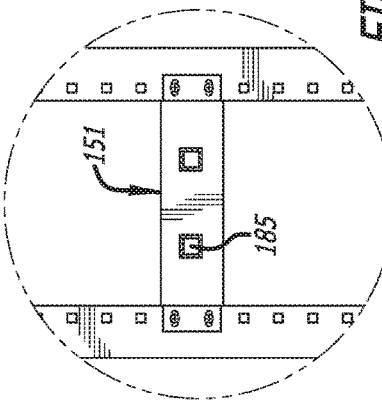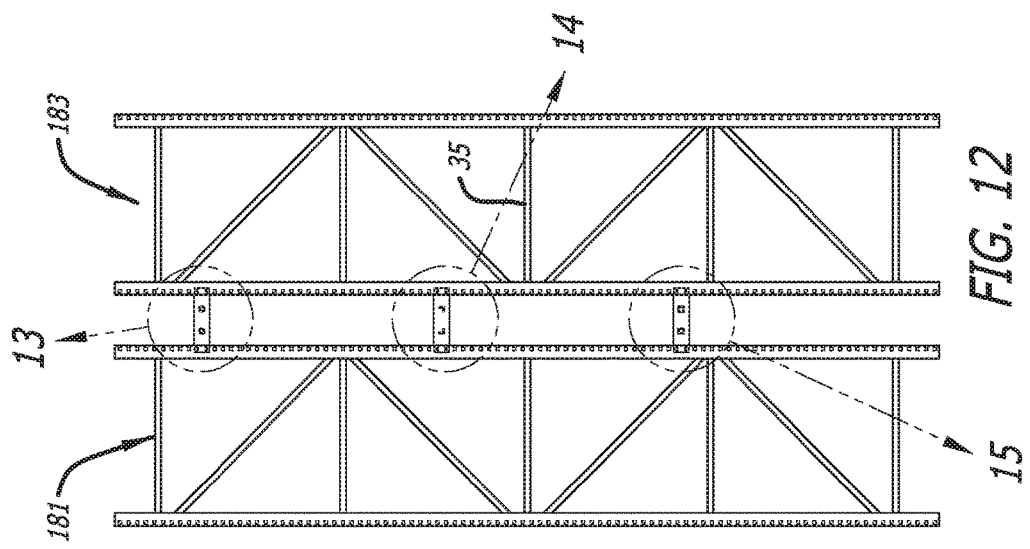

PALLET SPACER SYSTEM AND METHOD OF USE

BACKGROUND

Field of the Invention

The present invention relates to pallet racks typically utilized in distribution centers, warehouses and merchandising outlets for storing pallets typically loaded with goods.

Description of the Prior Art

In warehouses, the main function of storage racks is to store and support distribution of products from their facilities to customers or stores. Pallet racking is made of steel frames (uprights) for the vertical members and the horizontal members acting as load beams forming pallet decks. Typically the racks are arranged in flanking rows spaced apart a short distance and accessible from their outer edges by fork lifts traveling about fork lift bays to load and unload pallets from the respective pallet decks. Oftentimes commercially available pallets are deeper than the pallet racks resulting in the pallets overhanging both the inside and outside edges of the pallet racks. It is desirable to maintain spacing between the flanking rows of racks so it has become common practice to mount pallet stops on the inside edges of the pallet racks to act as stops to limit the extent to which the respective pallets will extend from the rear side of the racks.

Also, in some jurisdictions fire authorities require a minimum space between pallets on adjacent rows to leave an unencumbered vertical and horizontal space throughout the height and length of the rows to act as a flue in the event of a fire. It has thus become common practice to incorporate what is termed "row spacers" to maintain the desired spacing for these flues. The row spacers can range from 2" wide to 36" wide depending on the application. The amount and type (heavy duty or regular) of row spacer is determined by the engineer producing seismic or engineering calculations for the particular job.

Most of the row spacers on Selective Pallet racking are 12" long or 18" long. The reason for the most prevalent length of 12" is based on a standard frame depth of 42" and a standard pallet depth of 48". The typical expectation in the past is the forklift driver would overhang the pallet across the two load beams by approximately 3" on either side which would allow for an open space of 6" between adjacent rows of pallets providing they were positioned properly with a 12" row spacer in place.

The reality of working in a warehouse is that the pallet-put-away is often fast-paced, leaving the fork lift driver with little time to position the pallets precisely on the beams. Thus, when the pallets are placed on the beams the transverse distance can vary a few inches either way, often closing the width of the flue space mandated by the local fire authorities. Because the 6" wide vertical flue extends the length of the racks is often encroached upon and in many cases rendered non-existent, some local fire authorities now require pallet stops. The pallet stops are an accessory pallet rack part that will stop a pallet at a fixed location to protect a 6" longitudinal flue space to assure this space being open throughout the rack system.

As more municipalities and fire prevention authorities have enforced the 6" unencumbered flue space requirement, several different styles of pallet stops have been developed. Examples of pallet stops offered by businesses entities include:

Single Bay Wraparound Style: A single bay wraparound style pallet stop employing a system of square tubes extending the length of a single bay and then at the end forming a 90 degree bend toward the rack to join a standard end connector where it is welded in place. These are typically spaced 3" off the rear of the 42" deep frame, thus stopping the pallet from going beyond this distance to cooperate in establishing a combined 6" space from pallet to pallet carried on adjacent racks. One drawback of this system is that the stop extends into the flue area 1½" per side, thus encroaching on the flue space mandated by many fire jurisdictions.

Z-Type: Another popular system sold by manufacturers is the Z-type bracket, which is 4" to 6" wide piece that is typically bolted in place to a bolt pattern in alignment with the center of the pallet. This has been approved by some fire authorities, but there have been issues due to insufficient integrity to withstand the pounding to which pallets are exposed, and bending to the rear, thus failing to function to properly stop the pallets to maintain the required spacing. The other issues with the Z-Type pallet stop is that if a pallet is placed on the top of the stop, the damage usually renders it useless for future loading. This Z-bracket can also be detrimental to the load beams supporting the pallets because it is typically of heavier gauge than the beam. When the load impacts the Z-bracket, it can damage the supporting load beam because the 14-16 gauge beams do not have sufficient structural integrity to withstand the abuse transmitted when a thicker gauge Z-bracket stop is impacted. Another disadvantage is the Z-bracket system is not adaptable to mounting on beams with different face sizes or bolt patterns thus presenting the challenge of inventorying and selection of the appropriate bracket for the particular application.

A modification of the Z-shaped stop incorporates a vertical mounting flange formed with a window to be slidably received over a transverse beam for convenient mounting of the stop. A device of this type is shown in U.S. Pat. No. 6,173,846 to Anderson. While such stops tend to serve their desired function, they are relatively expensive to manufacture, labor intensive to install and prone to damage.

Other efforts have led to a proposed horizontal, inverted, U-shaped bracket which is mounted to the longitudinal beams of adjacent racks to maintain the desired spacing and which may mount a sprinkler conduit between the adjacent racks. A device of this type is shown in U.S. Pat. No. 3,802,574 to Weider. A similar effort has recently led to a proposal that an inverted U-shaped member be mounted between the beams of racks to maintain the desired spacing. A device of this type is promoted by Rack Safety Products LLC of Aliso Viejo, Calif. These devices are also expensive to manufacture and install and, once installed, limit the maneuverability of the adjacent racks.

Further efforts have led to a proposal of an adaptor bracket configured with a universal mounting hole pattern for mounting a stop. A device of this type is shown in U.S. Patent Application No. 2014/0110547 to Consaul. Again, this device is relatively expensive to manufacture and install and does not seem to have gained commercial acceptance in the marketplace.

Consequently, there remains a need for a pallet stop system which is convenient and inexpensive to install which positively establish a continuous integral stop to limit pallet encroachment in the space between flanking rows of pallet racks. Preferably the system employs the expedient of mounting directly to commercially available racks to, when installed, establish the desired distance of the stop from the edge of the pallet decks or their loads.

SUMMARY OF THE INVENTION

The present invention includes a pallet stop system for mounting to flanking rows of pallet racks and which continues throughout the length of the rows of flanking racks. The system includes elongated, integral stop rail devices spaced a selected distance from the respective proximate edges of the racks. A plurality of hangers are preformed to mount from attachment bores or the like spaced along vertical posts in the racks and are formed with openings for mounting the integral stop rail devices spaced the selected distance from the pallet decks.

In some embodiments, the integral stop rail devices act as a spacers to cooperate in maintaining a minimum horizontal space between adjacent rows of racks to provide, for instance, a 6" minimum flue space throughout.

The method of the present invention includes forming an elongated, integral stop rail device to be installed alongside multiple end-to-end pallet racks. Prefabricated hanger straps mounted from the respective rack, or racks, establish selected spacing for the elongated, integral stop rail devices. The integral stop rail devices may be made in multiple segments, connected together to extend continuously from one end of a row of racks to the other.

BRIEF DESCRIPTION OF THE DRAWINGS

FIG. 1 is a top plan view illustrating a row of flanking pallet racks separated by an integral stop rail device of the present invention and illustrating several modifications thereof;

FIGS. 2, 3, 4, 5 and 6 are detail views, in enlarged scale, taken from the circles 2, 3, 4, 5 and 6 respectively in FIG. 1 and depicting sections of the integral stop rails;

FIG. 7 is a further embodiment of the integral stop rail device system of the present invention;

FIG. 12 is an end view of a pair of flanking rows of pallet racks separated by integral stop rails of the present invention;

FIGS. 13, 14 and 15 are detail views, in enlarged scale, taken from the respective circles 13, 14 and 15 in FIG. 12;

DETAILED DESCRIPTION OF THE PREFERRED EMBODIMENTS

Figure 7A:
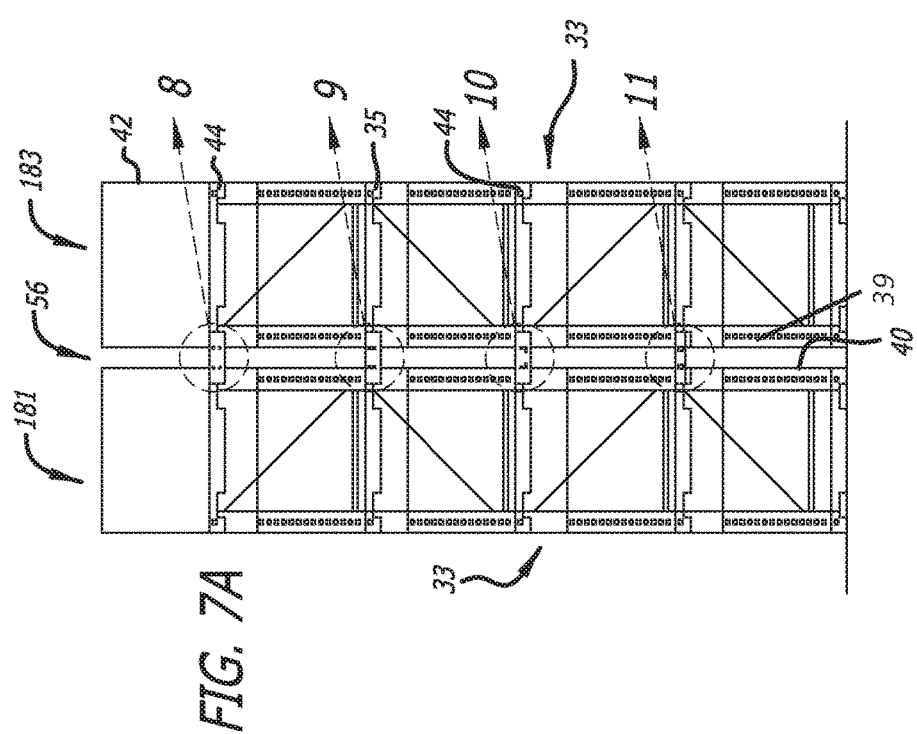
FIG. 7A is an end view of a pair of flanking rows of pallet racks defining a flue space incorporating integral rail stop devices to form flue spaces.

Referring to FIGS. 1, 7 and 7A, the present invention includes one or more elongated, integral, stop rail devices, generally designated 31, extending along the juxtaposed sides of rows of pallet racks 33 and spaced above the extended planes 37 of the top surfaces of load beams 35 and spaced laterally from the proximate edges of the racks. The stop rail devices are, in some instances, carried from the racks by mounting elements which may be in the form of modified metal hangers or straps known as row spacers, generally designated 41. In some embodiments, the straps may be constructed to cooperate in maintaining both the lateral spans between the racks and the minimum spacing between the sides 38 and 40 of the pallets and their respective loads 42 (FIG. 7A) to maintain a minimum lateral space of at least 4 to 6 inches or so between the juxtaposed edges of pallets to leave an unencumbered flue space top-to-bottom and end-to-end as required by the fire authorities of many localities. As will be described below, many municipalities in earthquake-prone areas require stabilizing of adjacent racks, as by spacer strap devices such as that shown in FIG. 7 to stabilize adjacent rows with each other and positively maintain spacing between those rows. In some embodiments I adopt the expedient of modifying those straps to act as mounts for the integral rail stops of my invention.

As will be appreciated by those skilled in the art, modern day warehouses have grown to the point where most exceed 10,000 square feet and only about 37% are less than 25,000 square feet, and an equal number exceed 100,000 square feet. Each warehouse is of its own configuration, typically incorporating exterior walls and interior posts or columns, the configuration of which must be taken into account in designing the layout for the installation and organization of pallet racks, access to opposite sides of flanking rows of racks. It would be of great benefit to the industry if a system were available to allow for racks arranged in a row to be modified by adding rail stops extending the full length of the rows of the different lengths dictated by the particular warehouse layout.

Experience has shown that a fire danger exists in warehouses or other facilities used for storing merchandise on pallets stacked on racks. Referring to FIG. 7A, a minimum horizontal spacing should be maintained between the proximate edges 38 of pallets 44 an their loads 42 supported on back-to-back racks throughout the full height and lengths of the rows of racks to provide vertical openings between racked pallets to act as unobstructed flues 46 throughout. Both vertical and horizontal spacing is important to maintain a clear vertical flue between to vent heat throughout the height and length from any fires that may start in lower parts of the racks. This open vertical and horizontal flue allows for ceiling or in-rack sprinklers, to spray directly down on the flames to limit horizontal spread of the fire. It is also important that water reach the lower tiers to act directly on the base of the fire. In fact, many municipalities and governmental agencies have enacted codes to establish the minimum spacing between pallets mounted on such racks so as to maintain a minimum open-distance of six inches or so between the respective pallets carried on the racks. The situation is complicated by the fact that the lateral lengths of the pallets are often greater than the lateral widths of the respective support beam structure so there is overhang of, say three inches, on one or both sides of the beam structure. It is this problem to which one aspect of the present invention is directed.

As will be appreciated by those skilled in the art, in these embodiments, the hanger straps act as anchors and may result in the stop rail devices being disposed a short distance into the flue space, as for instance 2-3 inches depending on the cross section of the stop rail. While meeting some municipal codes this encroachment is prohibited by most final plan checkers who require the stop rail devices to be spaced laterally outside the unobstructed flow area.

To that end, for one aspect of the present invention I provide a fully unobstructed flue 46 dictated by the space between elongated integral stop rail devices 31 (FIG. 7-7A) to project longitudinally along the side of rows of individual racks. The stop rail device may be carried from hanger straps mounted to a rack or between adjacent racks. As will be appreciated by those skilled in the art, the load beams 35 (FIG. 7A) defining the horizontal beam structure are typically supported at multiple levels to provide vertically spaced support decks for each of the respective racks. I take advantage of this construction to construct and arrange my integral stop rail system so that, in some embodiments, the stop rail devices and their mounts can serve as spacers and may cooperate with the stop rail devices to maintain a selected minimum horizontal distance between pallets supported on flanking racks.

As noted, the width or depth of a standard pallet may be 48 inches and the depth of a rack defined by the support beams only 42 inches, thus leaving a pallet overhang on each side. By positioning my integral stop rail device, for instance, three inches from the extended vertical plane of the rear edge of the rack defined by the stop rail, when the forklift operator places the loaded pallet on the support beams, the stop rail device will limit the rear overhang to three inches, thus tending to maintain the pallet centered and the desired spacing between the pallets on flanking rows of racks. As will be appreciated by those skilled in the art, this predetermined distance of overhang may vary but in many current commercial embodiments, will be set at 3 inches.

For the purpose of illustration, I have shown five embodiments of the hanger devices 186 which may be may be incorporated in my integral stop rail device in FIG. 1 and depicted in detail in FIGS. 2-6. The device may be in the form of square or round tubes 185, 187, 189, 192 (FIGS. 2, 3, 7, 11, and 13), wires or cables 237 (FIG. 4), angle iron 190 (FIG. 7)or flat stock 191 (FIG. 6), or square tube 192 (FIG. 7). The stop rail device may be made up of segments of tubes, stock or wire which may be available in various different lengths such as 20 or 40 feet long, and may be connected together on their proximate ends by coupling devices, generally designated 61 (FIGS. 2, 3 5 and 6) to form an integral full length rail. As will be appreciated, the 40 foot lengths will be sufficiently long so the one piece will itself extend the length of several 8' or 12' long racks arranged in a long row.

Figure 6:
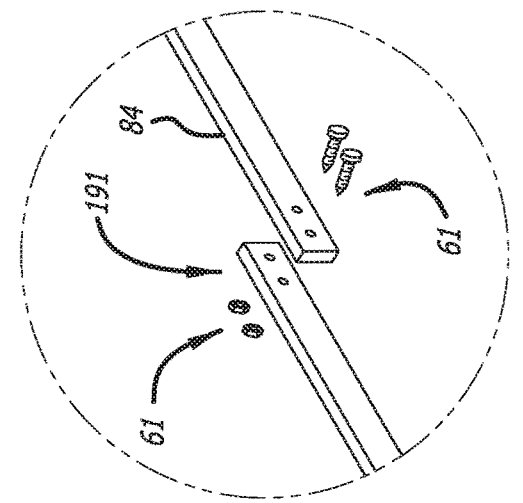
Figure 5:
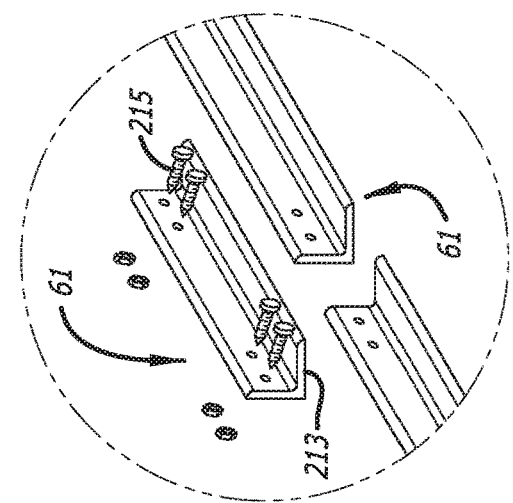
Figure 4:
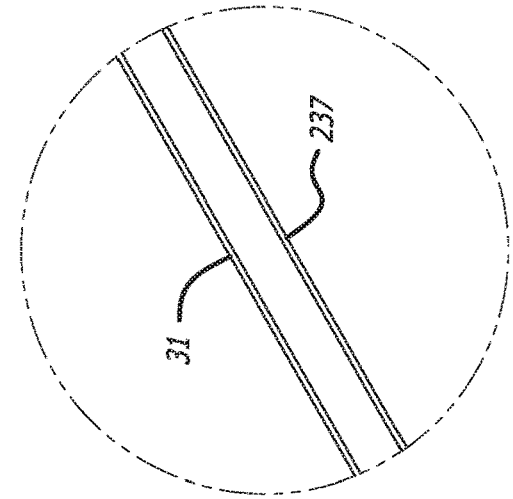
Figure 16:
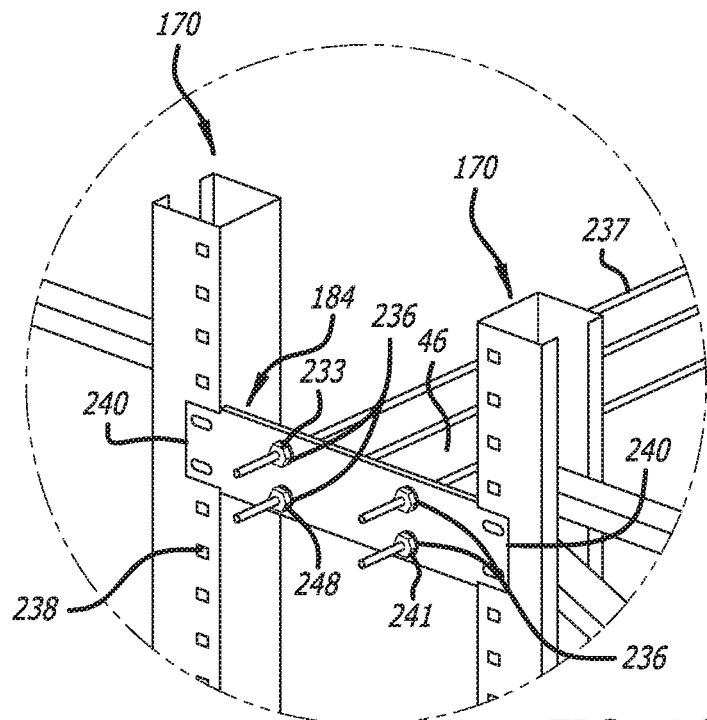
FIG. 16 is a partial end view of a pair of rows of pallet racks incorporating a modification of the integral stop rail of the present invention.

The segments may be coupled together by the couplings 61 which may be in the form of, for instance, a wire splice, clamp, internal or external members or, in some embodiments, telescoping members to be friction fit together, or just received in the opposite ends of threaded collars. For exemplary purpose, coupling members 61 are shown in FIGS. 3-4. Internal couplings may include square or round tube segments (FIGS. 2 and 3) to be friction fit in place or secured by fasteners such as Tex screws 203, 205, 211 or 215 (FIGS. 5 and 16.) This then establishes an integral rail which may extend for several hundred feet to reach the full length of a warehouse.

For the purpose of this description, the term integral stop rail device or stop rail is intended to mean an elongated strip extending the length of two or more racks and made up of one or more segments to act as a continuous stop. The term "rail" is intended to mean a strip of metal or like material such as, for example, and without limitation, tubing, bar stock, rod, wire, cable or cord of rigid material or drawn tight to act as stops and limit lateral movement of pallets positioned on adjacent pallet decks. Connection of segments may be by welding or coupling or the like or, in some instances, the proximate ends of the various lengths of rail segments may be merely abutted together in proximate relationship with one another and in general longitudinal alignment with one another. The term hanger strap is intended to mean any type of rigid hanger to be connected to one or more racks and having a rail mounting element for mounting the rail spaced a selected distance from the respective pallet decks.

Figure 10:
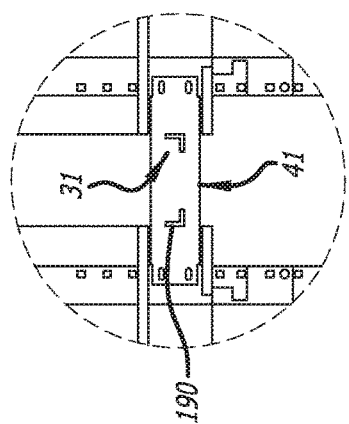
Figure 9:
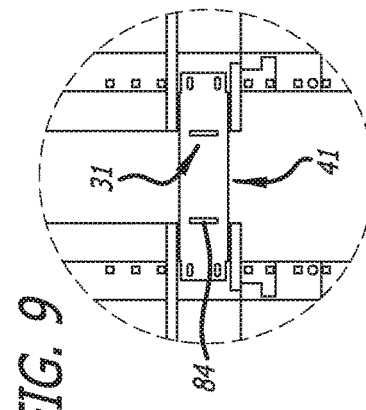
Figure 11:
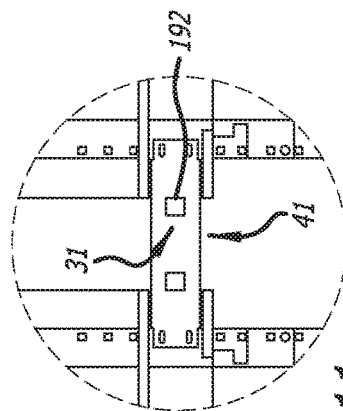

Referring to FIG. 7, the hanger devices 186 may take many different forms depending on the particular configuration of the integral stop rail devices, such as, for example, straps 182, 187, 189, and 185 including, respectively, an array of bores for receiving wires, 237, (FIGS. 7 and 16) an array of vertical slots for receiving strips 84 (FIGS. 7, 7A and 9) a pair of square openings for receipt of square tubes 185 (FIGS. 7, 7A and 11) or right angle slots for receipt of angle irons 190 (FIGS. 7, 7A and 10).

As show in FIGS. 7A-11, these integral stop rail devices may be positioned vertically above the levels of the respective support beams to be engaged by the proximate sides 38 and 40 of the respective pallets or their respective loads maintain a minimum flue width at 56.(FIG. 7A).

While in many applications I select spacer straps to mount at their opposite ends from flanking racks as described below, I have also found that mounting straps 91'-91'''' can be mounted cantileverly to serve as hangers. Referring to FIGS. 20-23, the straps 91'-91'''' are formed at their bases with a pair of vertically spaced horizontal slots 48 aligned with pairs of apertures 50 in vertical posts by 52, for instance shoulder bolts (not shown). The hanger straps 91'-91'''' are formed with respective vertical slots 77, angle slots 76 and bores 78, all spaced a selected distance from the slots 48 so as to space the openings a set distance laterally from the load beams in the pallet deck (FIG. 5). In some embodiments the strap 91'-91'''' may be configured to cooperate in establishing a spacing between adjacent rows of racks for the purpose of maintaining the so-called flues 46 of the required width between the respective racks in the respective flanking rows.

Figure 8:
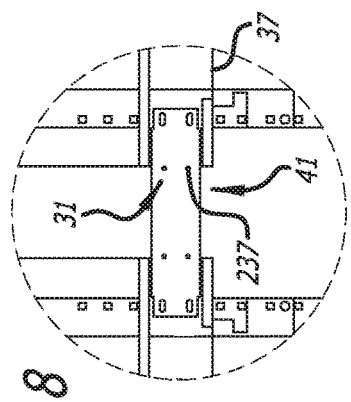
FIGS. 8, 9, 10 and 11 are detail sectional views in enlarged scale, taken from the circles designated 8, 9, 10 and 11, respectively, in FIG. 7A.

In practice, I have found that 14 gauge tubes, 1 or 1½ inches square or 1 inch in diameter can be coupled together to serve the purpose of acting as an integral stop rail device. Other cross sections will occur to those skilled in the art, such as, for instance, T-bar or angle iron 190 (FIGS. 10 and 14), round or square tube 189 and 185 (FIGS. 2, 3 and 11), channel strips or flat bar 84 (FIG. 9) and cable, cord or heavy gauge wire 237 (FIGS. 4, 8 and 16).

As noted above, in some locales, particularly those prone to earthquakes, the local codes require that racks in adjacent rows be coupled together as by metal strips or straps tending to stabilize the racks and pallets in the event of a seismic event. For various configurations some codes even establish the necessary horizontal spacing between flanking racks, such as at least 10, 12 or 18 inches. I have found it expedient to construct straps 165, 157 and 151 (FIGS. 12-15) to facilitate these coupling and spacing requirements. In some embodiments I form the straps 151, 165 and 157 with the openings spaced horizontally apart to receive square tubes, angle irons or round tubes spaced apart to maintain a space of approximately 4 inches, or in some instances 7½ inches, or even other selected distances so the spacing of the elongated stop rail devices mounted therein will stop the pallets at the required position necessary to meet local code.

As will be appreciated by those of skill, a great advantage of one embodiment of the present invention is that the hanger straps or rails may be manufactured in an assembly line as a kit to be available when the time comes to connect rows of conventional pallet racks in situ to establish the desired stop for the pallets and/or set the desired spacing between side-by-side racks.

Figure 24:
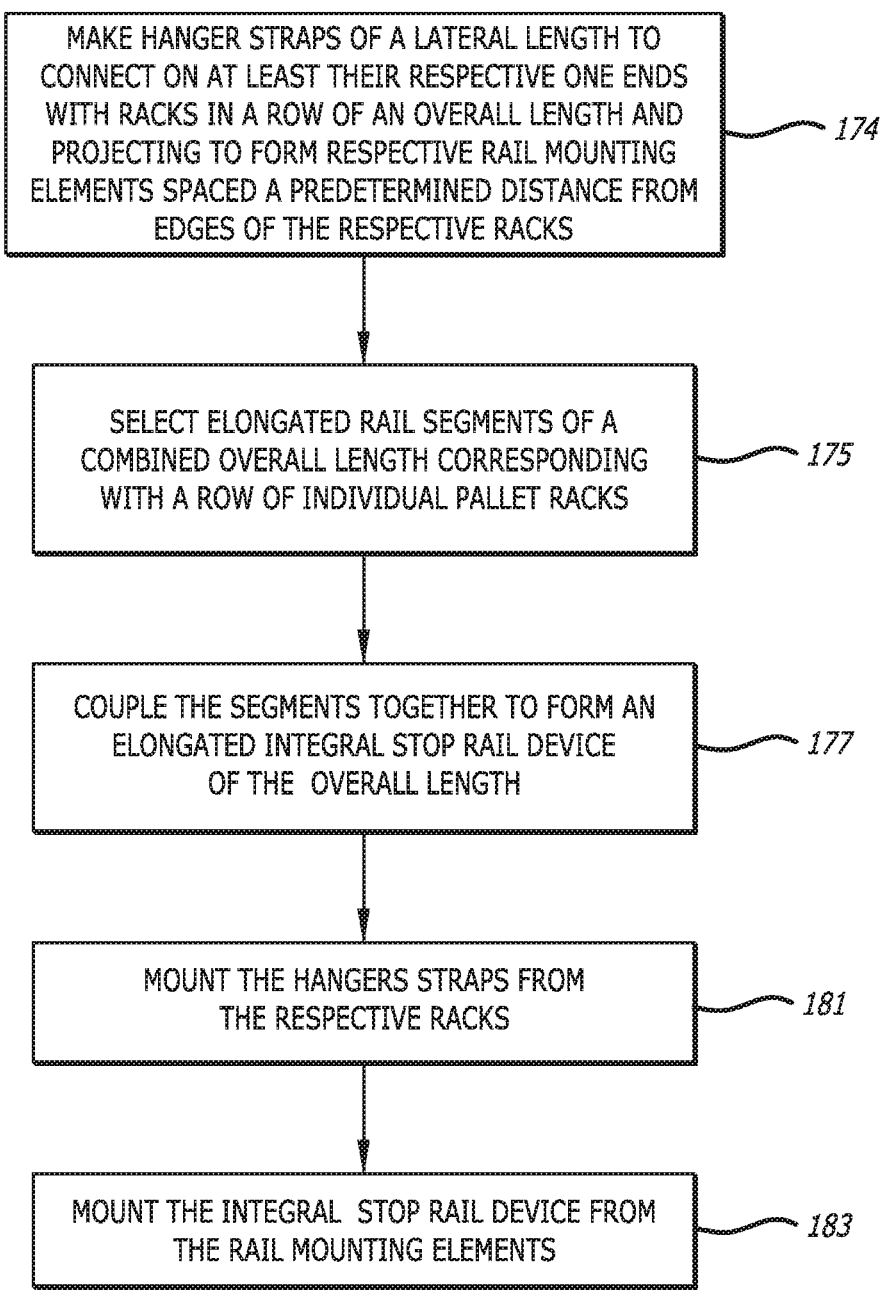
FIG. 24 is a flow diagram of a method of the present invention.

Referring to FIG. 24 in practice the method of the present invention the workman will make hanger straps at 174, will determine the overall lengths of the combined racks of a row and then select the necessary rail segments at 175 to be coupled together at 177 to make an integral rail stop. The hanger straps may be retrieved from inventory and mounted from the respective racks at 181 for then mounting the integral stop rail device 31 at 183. It will be appreciated that in some instances, the sections of the stop rail devices are inserted longitudinally through the rail mounting elements and sometimes just slid downwardly into place from the open top of the rail-receiving openings.

As will be appreciated, in practice, during fabrication the hanger strips may be stamped out with the specific lateral lengths to correspond with the desired spacing of mounting bores or slots in the rack posts and the spacing of the rail mounting elements from those mounting bores. When installation is to be completed the hanger straps may be mounted to the respective racks at the desired level above the level of the respective pallet support beams and spaced the selected distance laterally of the edges of such tacks to accommodate overhang of the pallets.

The particular sections of the elongated integral stop rail segments may then be positioned in the aligned windows, slats or bores in one convenient installation step. The proximate ends may then be coupled together as by couplings 61 or for the wire or cable embodiments with wire clamps or convenient spacers. In some instances, the proximate ends of segments of tubes will be telescoped together for friction fit or joined by spot welding, threading and/or other couplings known in the art, or as described below.

The racks will then be available for receipt of the pallets delivered by forklift so that the pallets may be loaded from the bay side of the respective racks and the lateral travel thereof will be limited by engagement with the elongated integral stop rail devices 31 at the far side of the rows of racks. For example, in some embodiments, the spacing between the respective racks will be maintained at the desired spacing of 6, 7½, 10, 12, 18 inches or other spacing as prescribed by code and incorporated in the manufacture of the hanger straps.

Referring to FIGS. 12-15, for exemplary purposes, I have shown a pair of flanking rows of racks 181 and 183, connected together by the respective spacer straps 151, 157 and 165 to cooperate in maintaining the stability between the respective rows of racks, and also serving as a mount for spacing the respective integral stop rail devices a desired distance apart for limiting pallet travel on the respective load beams at the various levels of the racks.

For the purposes of illustration, I show the flanking rows of pallet racks configured with various modifications of stop rail devices 185, 187 and 189, square and round tube and angle carried from respective openings spaced the desired distance apart in the straps. In some embodiments I form my hangers with two pairs of openings for each the stop rail devices to thus provide the option for installation to provide, for instance a 6" wide or 12" wide flue.

The embodiment shown in FIG. 16 includes a horizontally elongated, rectangular hanger 184 for connecting between rows of racks and formed with a pattern of four bores 233 arranged in a rectangular pattern to, when mounted by bolts through the mounting slots at the opposite ends 240 to the vertical posts 183 via square apertures 238, space the pairs of vertically spaced bores approximately three inches horizontally from the lateral extent of the racks. The pairs of vertically aligned bores are spaced about six inches apart horizontally to establish a six inch wide flue. Extending through the respective bores 233 are wire cables 237. The cables 237 may include tensioners on their respective ends, such as nuts 236 screwed over the threaded ends to press turn buckles or the like. In some embodiments, I substitute heavy gauge wire for the cables.

Referring to FIGS. 7 and 16, in some embodiments, the hangers at the ends of the racks include extra reinforcement around the respective bores, such as over-sized washers 248 or the like, so that the cables may be anchored through such washers to facilitate the hangers 182 carrying the stress of tensioning and shock of the cables being bumped along their lengths by pallets being loaded on and offloaded from the pallet decks.

Thus, installation of the particular integral rails formed by such wires may be achieved by mounting the hangers from the adjacent racks and threading the wires through the respective bores 233. Tension may be applied to such wires as by a tensioner and the ends crimped off, clamped or screwed tight by the nuts 241 to hold thereon.

Figure 17:
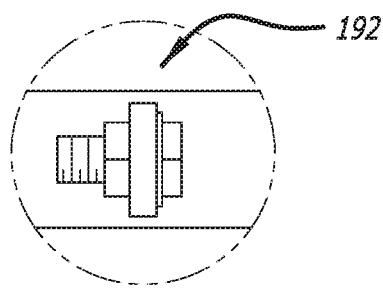
FIGS. 17, 18 and 19 are detail sectional views of end fittings that may be incorporated in the integral stop rail device of the present invention.
Figure 18:
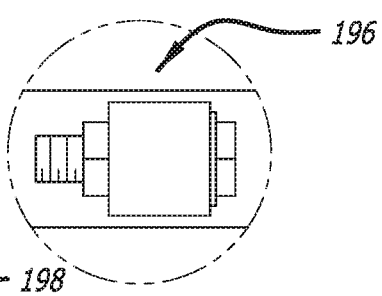
Figure 19:
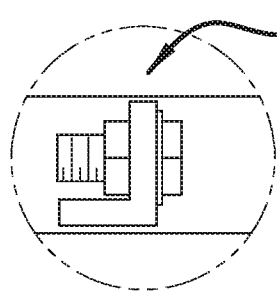
Figure 20:
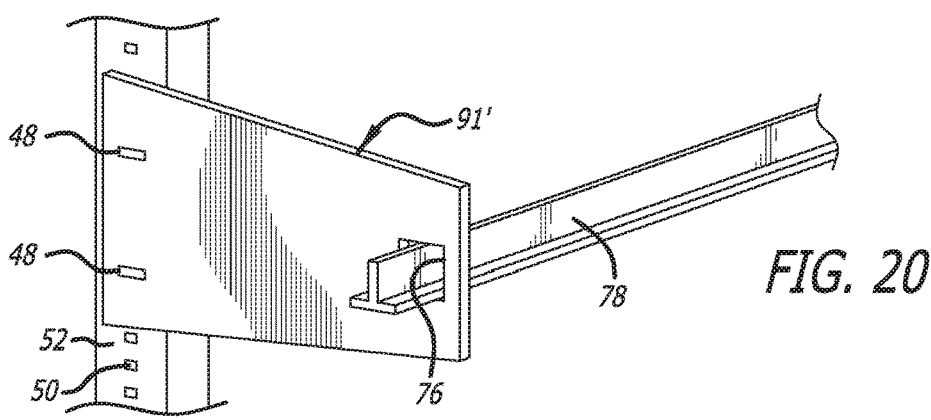
FIGS. 20, 21, 22 and 23 are partial perspective views of rail systems incorporating the present invention.
Figure 21:
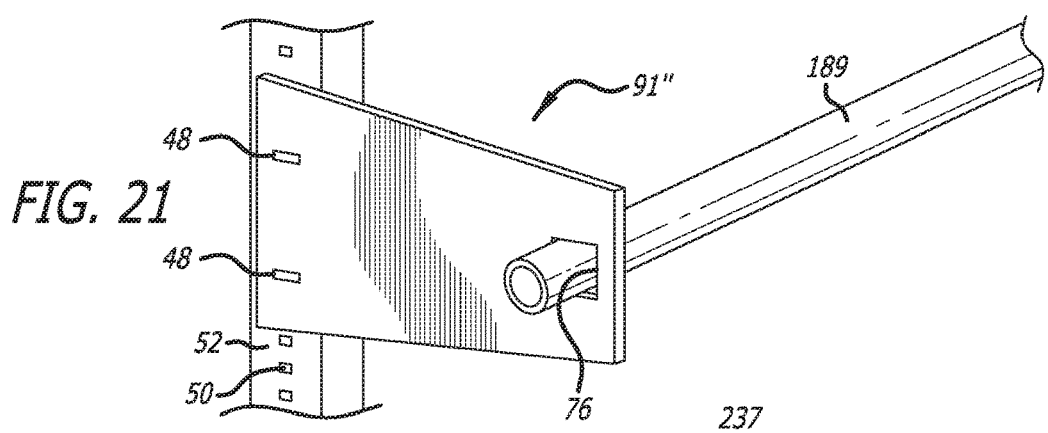
Figure 22:
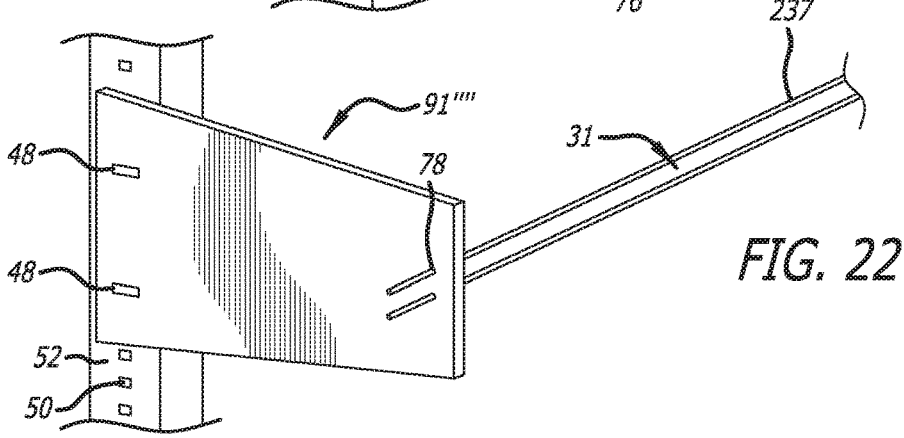
Figure 23:
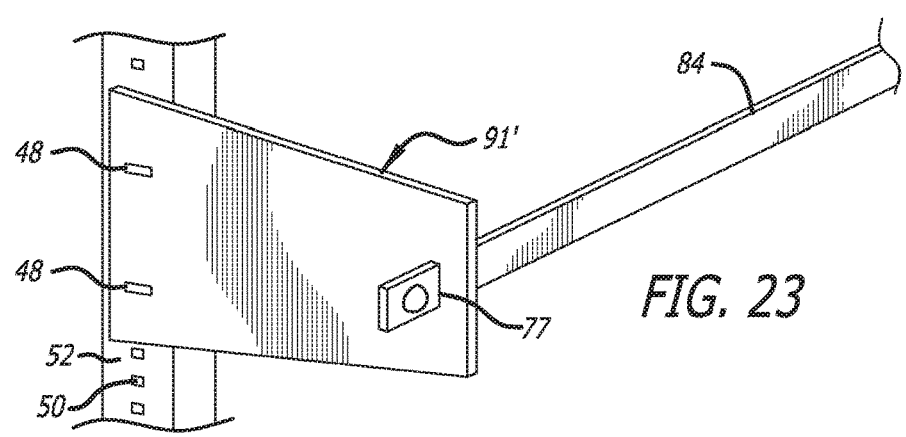

Referring to FIGS. 17-19, in some embodiments, I conveniently anchor the ends of the stop rail devices, as by a nut and bolt stop 192, cross bolt 196 or anchor bolt 198 on a flange of the angle stop rail.

From the above it will be apparent that the present invention provides an economical and effective apparatus for manufacturing original equipment or adding stop apparatus to existing racks to maintain the desired positioning of pallets on the racks and in some instances to also maintain the desired spacing between the adjacent rows of racks. My integral stop rail device may be constructed of relatively inexpensive components, such as sections of angle bar, bar stock, square tubes or even wire stretched taut and supported at the opposite ends from anchors. My system has particular utility for retro-fitting onto existing racks installed in warehouses having a pre-established configuration dictated by structural columns and the like constraining the engineer to specified spacing of the racks to accommodate such columns and still allow for access by fork trucks loading and unloading the pallets.

Although the present invention has been described in detail with regard to the preferred embodiments and drawings thereof, it should be apparent to those of ordinary skill in the art that various adaptations and modifications of the present invention may be accomplished without departing from the spirit and the scope of the invention. Accordingly, it is to be understood that the detailed description and the accompanying drawings as set forth hereinabove are not intended to limit the breadth of the present invention.

What is claimed:

1. A pallet rack system for storing pallets in warehouses comprising of:
   a plurality of spaced apart pallet racks;
   wherein each pallet rack comprises:
   two spaced apart first vertically extending upright posts and two spaced apart second vertically extending upright posts; wherein the first vertically extending upright posts are spaced apart from the second vertically extending upright posts; wherein a first plurality of spaced apart horizontal support beams extend between and connects each of the first vertically extending upright posts together, wherein a second plurality of spaced apart horizontal support beams extend between and connects each of the second vertically extending upright posts together; each of the first vertically extending upright posts has a plurality of first holes therein, each of the second vertically extending upright posts has a plurality of second holes therein; wherein a first horizontal support beam from said first plurality of spaced apart horizontal support beams and a second horizontal support beam from the second plurality of spaced apart horizontal support beams forms a row wherein a pallet is configured to extend between and be supported on the first horizontal support beam and the second horizontal support beam;

wherein a first pallet rack from said plurality of spaced apart pallet racks is spaced apart from a second pallet rack from said plurality of spaced apart pallet racks;

a pair of pallet rack stop devices, each of the said pallet rack stop devices is planar and has apertures at ends of each of the pallet rack stop devices, wherein a first pallet rack stop device from said pair of pallet rack stop devices extends between the first pallet rack and the second pallet rack; wherein a first corresponding set of apertures from the apertures of the first pallet rack stop device align with the first holes of a corresponding first vertically extending upright post from said two spaced apart first vertically extending upright posts of said first pallet rack, and a second corresponding set of apertures from the apertures of the first pallet rack stop device align with the first holes of a corresponding first vertically extending upright post from said two spaced apart first vertically extending upright posts of said second pallet rack;

wherein a first plurality of fasteners are inserted through the first corresponding set of apertures of said first pallet rack stop device respectively and the first holes of the corresponding first vertically extending upright post of the first pallet rack;

wherein a second plurality of fasteners are inserted through the second corresponding set of apertures of said first pallet rack stop device respectively and the first holes of the corresponding first vertically extending upright post of the second pallet rack to mount the first pallet rack stop device to the first pallet rack and the second pallet rack;

wherein a second pallet rack stop device from said pair of pallet rack stop devices extends between the first pallet rack and the second pallet rack; wherein a third corresponding set of apertures from the apertures of the second pallet rack stop device align with the second holes of a corresponding second vertically extending upright post from said two spaced apart second vertically extending upright posts of said first pallet rack, and a fourth corresponding set of apertures from the apertures of the second pallet rack stop device align with the second holes of a corresponding second vertically extending upright post from said two spaced apart second vertically extending upright posts of said second pallet rack;

wherein a third plurality of fasteners are inserted through the third corresponding set of apertures of said second pallet rack stop device respectively and the second holes of the corresponding second vertically extending upright post of the first pallet rack, wherein a fourth plurality of fasteners are inserted through the fourth corresponding set of apertures of said second pallet rack stop device respectively and the second holes of the corresponding second vertically extending upright post of the second pallet rack to mount the second pallet rack stop device to the first pallet rack and the second pallet rack;

wherein a plurality of elongated flat rails or a plurality of wires are mounted to the pair of said pallet rack stop devices between the first pallet rack and the second pallet rack; wherein the flat rails or the wires each extend through each of the pair of pallet rack stop devices and has a length longer than the first pallet rack and the second pallet rack; wherein the pair of pallet rack stop devices form a flue space between the first pallet rack and the second pallet rack of at least 6 inches; wherein the plurality of flat rails or the plurality of wires comprise two parallel and spaced apart upper flat rails and two parallel and spaced apart lower flat rails that are below the upper flat rails, or two parallel and spaced apart upper wires and two parallel and spaced apart lower wires which are below the upper wires.

2. The pallet rack system of claim 1, wherein the first and second integral stop rail devices are constructed of metal.

* * * * *